(12) United States Patent
Yu et al.

(10) Patent No.: US 9,367,634 B2
(45) Date of Patent: Jun. 14, 2016

(54) OPTIMIZING LOCATION AND MOBILE SEARCH

(71) Applicant: BRIGHTEDGE TECHNOLOGIES, INC., San Mateo, CA (US)

(72) Inventors: Jimmy Yu, Foster City, CA (US);
Sammy Yu, San Mateo, CA (US);
Lemuel S. Park, Cerritos, CA (US);
Thomas J. Ziola, Menlo Park, CA (US);
Markus Spohn, Foster City, CA (US);
Emeka Ajoku, San Mateo, CA (US)

(73) Assignee: BRIGHTEDGE TECHNOLOGIES, INC., San Mateo, CA (US)

( * ) Notice: Subject to any disclaimer, the term of this patent is extended or adjusted under 35 U.S.C. 154(b) by 500 days.

(21) Appl. No.: 13/748,157

(22) Filed: Jan. 23, 2013

(65) Prior Publication Data

US 2013/0191361 A1 Jul. 25, 2013

Related U.S. Application Data

(63) Continuation-in-part of application No. PCT/US2013/022606, filed on Jan. 22, 2013.

(60) Provisional application No. 61/588,642, filed on Jan. 19, 2012, provisional application No. 61/655,957, filed on Jun. 5, 2012.

(51) Int. Cl.
*G06F 17/30* (2006.01)
*G06Q 30/02* (2012.01)

(52) U.S. Cl.
CPC ........ *G06F 17/3087* (2013.01); *G06Q 30/0244* (2013.01); *G06Q 30/0256* (2013.01)

(58) Field of Classification Search
CPC .................. G06F 17/30864; G06F 17/30867
USPC .......................................................... 707/706
See application file for complete search history.

(56) References Cited

U.S. PATENT DOCUMENTS 8,341,147 B2 * 12/2012 Hu .................... G06F 17/30864
 707/723
8,620,892 B2 12/2013 Park et al.
(Continued)

FOREIGN PATENT DOCUMENTS

KR 10-2010-0079340 A 7/2010

OTHER PUBLICATIONS

International Search Report dated May 15, 2013 as received in Application No. PCT/US2013/022606.
(Continued)

*Primary Examiner* — Richard Bowen
(74) *Attorney, Agent, or Firm* — Maschoff Brennan

(57) ABSTRACT

A method of optimizing digital content for searches performed on mobile devices. The method may include receiving digital content that includes one or more pages and analyzing the digital content to determine one or more properties of the digital content that relate to placement of a reference to the digital content in mobile search results. The method may also include analyzing the properties of the digital content to determine one or more optimizations to apply to the digital content to improve the placement of the reference to the digital content in the mobile search results. In addition, the method may include generating one or more recommendations for adapting the digital content based on the optimizations.

27 Claims, 7 Drawing Sheets

(56) References Cited

U.S. PATENT DOCUMENTS

| | | | |
|---|---|---|---|
| 8,671,089 B2 | 3/2014 | Yu et al. | |
| 2005/0114319 A1* | 5/2005 | Brent | G06F 17/30864 |
| 2006/0212451 A1* | 9/2006 | Serdy | G06F 17/30613 |
| 2007/0061302 A1* | 3/2007 | Ramer | G06F 17/3087 |
| 2008/0189360 A1* | 8/2008 | Kiley | G06F 17/30867 709/203 |
| 2008/0243821 A1* | 10/2008 | Delli Santi | G06F 17/3087 |
| 2009/0157666 A1* | 6/2009 | Gehrke | G06F 17/30864 |
| 2010/0268700 A1* | 10/2010 | Wissner | G06F 17/30864 707/706 |
| 2011/0131203 A1* | 6/2011 | Bodin | G01S 19/14 707/724 |
| 2015/0154636 A1* | 6/2015 | Spitkovsky | G06F 17/30342 705/14.54 |

OTHER PUBLICATIONS

Written Opinion of the International Searching Authority dated May 15, 2013 as received in Application No. PCT/US2013/022606.

Nazir, "Optimization and Modeling of Content Delivery Algorithms for Dense Mobile Social Networks" Electrical Engineering & Telecommunications, May 2010, pp. 1-175, see pp. 3, 4, 21-24, 93-95.

* cited by examiner

OPTIMIZING LOCATION AND MOBILE SEARCH

CROSS-REFERENCE TO RELATED APPLICATIONS

This patent application is a continuation-in-part of International Patent Application No. PCT/US2013/022606, filed on Jan. 22, 2013, which claims priority to U.S. Provisional Patent Application No. 61/588,642, filed Jan. 19, 2012, and to U.S. Provisional Patent Application No. 61/655,957, filed on Jun. 5, 2012, all of which are incorporated herein by reference.

BACKGROUND

Search engine optimization (SEO) generally describes the use of computing systems for running computing processes that collect, store and analyze search engine data in order to provide recommendations to improve visibility of a website or a webpage in search engines. Search engine results may be obtained by various search strategies, such as natural, unpaid, organic, or algorithmic search results as well as for paid search algorithms of search engine marketing (SEM) target paid listings. Generally, the higher a website is located on a website listing and the more frequently a website appears in the search results list, the more visitors it may receive from the search engine's users. An entity may target different kinds of search results besides strictly website results for SEO. For example, universal results, such as images, location, videos, news, and other industry-specific vertical search results may be optimized for search engines. SEO may improve the availability for to internet users to access a website or other digital content.

With the increase in mobile technology, more and more internet users are accessing the internet through mobile devices, such as smart phones, tablets, and other mobile devices. Search engines and other providers of content on the internet are adapting to the increase in searches performed on mobile devices in various ways to optimize the user experience for users performing searches on mobile devices. In addition, a recent increase in search activity while end-users are moving from place to place with their mobile devices has been associated with a marked transition by search engines who increasingly display search results filtered and organized by the location of the end-user of a search, resulting in search results being organized and displayed differently by device type (non-mobile devices vs. mobile device) as well as differently by the location of the device.

The explosion in the combinations of types of devices, the increasing sophistication of search engines that return search results intended for display on certain classes of devices, the targeting of content for delivery in an arbitrary number of specific locations (cities, towns and other regions and areas, as such entities may be variously defined) makes it increasingly difficult for digital marketers to identify, track, monitor, and compare differences in search performance by device and by location, putting a premium on highly scalable solutions that are increasingly integrated and highly automated.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A method of analyzing, reporting on, and optimizing digital content for searches performed on mobile devices. The method may include receiving digital content that includes one or more pages intended for display on various classes of devices, receiving search results for one or more of the various classes of devices, and analyzing the digital content to determine one or more properties of the digital content that relate to placement of a reference to the digital content in the search results for the one or more of the various classes of devices. The method may also include analyzing the properties of the digital content to determine one or more optimizations to apply to the digital content to improve the placement of the reference to the digital content in the search results for the one or more of the various classes of devices and generating one or more recommendations for adapting the digital content based on the optimizations across the one or more of the various classes of devices.

A method of optimizing a website for searches performed using a search engine that are based on physical locations where the searches are requested by managing location data for the website. The method may include accessing location data in a location database, the location data being associated with and available on a website of a business and the location data including information about at least one physical location of the business and receiving search results for one or more locations. The method may also include analyzing the location data to determine one or more properties of the location data that relates to placement of a reference to the website in the search results for the one or more locations and analyzing the properties of the location data to determine one or more optimizations to apply to the location data to improve the placement of the reference to the website in the search results for the one or more locations. The method may also include generating one or more recommendations for adapting the location data based on the optimizations.

A method of search engine optimization based on a location may include performing a first search on a network with a search engine using a first keyword to obtain first search results. The first search may be based on a first location. The method may further include identifying a first position for a reference to digital content within the first search results and performing a second search on the network with the search engine using a second keyword to obtain second search results. The second search may be based on a second location. The method may further include identifying a second position for the reference to the digital content within the second search results and generating a recommendation based on the first position and the second position to adapt the digital content to improve the position of the reference to the digital content within either or both the first and second search results.

These and other aspects of example embodiments of the invention will become more fully apparent from the following description and appended claims.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DESCRIPTION OF EMBODIMENTS

Figure 1:
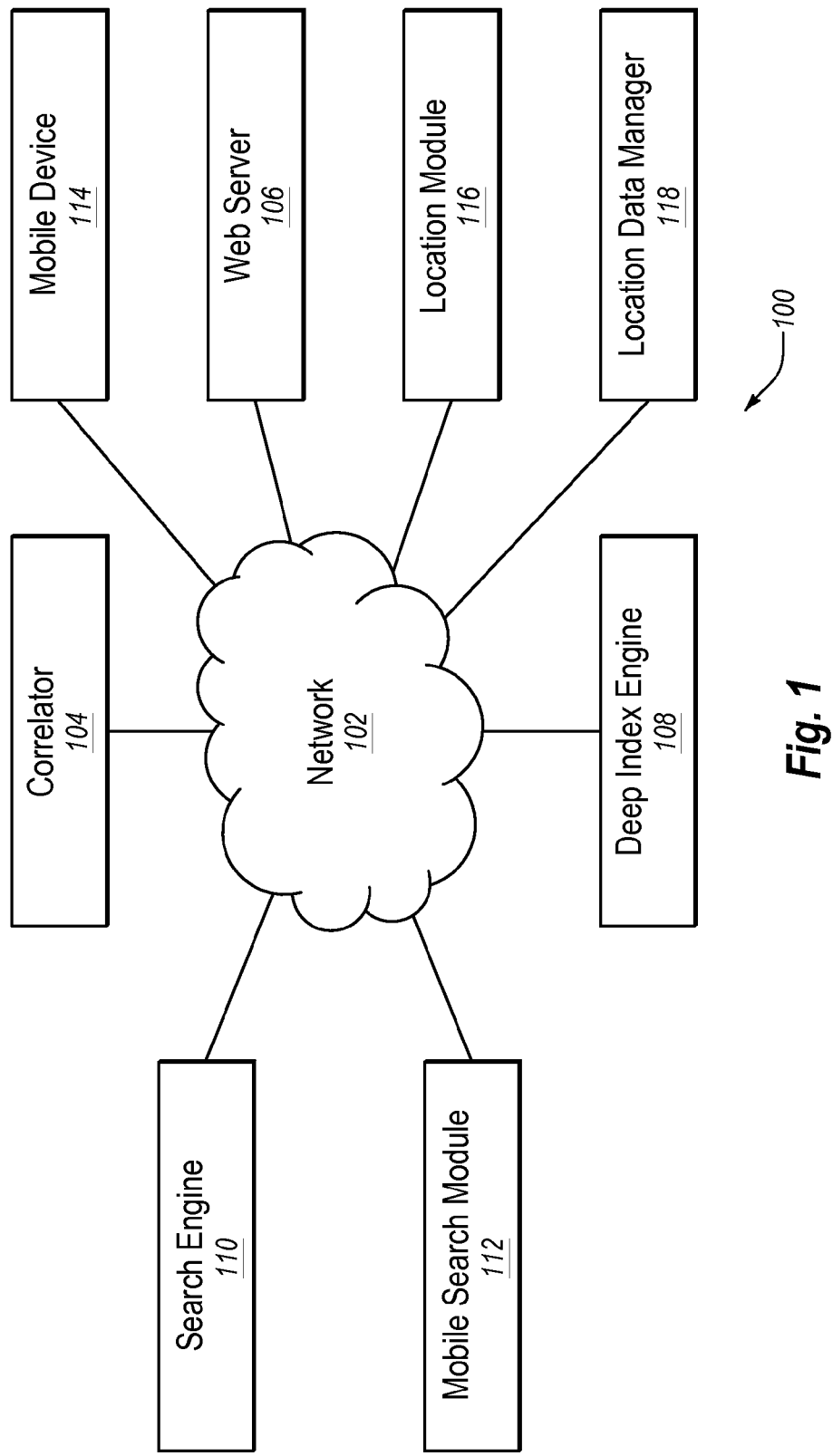
FIG. 1 illustrates an example of a digital content auditing system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

With the increase in mobile technology, more and more users are using mobile technology to interact with networks, such as the World Wide Web ("Web"), through one or more portals such as the internet. These mobile technologies include cellular phones, such as smart phones, gaming consoles, global positioning system devices, tablet computers, portable music devices, and other types of mobile devices.

More particularly, searches are being performed on mobile devices rather than on non-mobile devices, such as traditional personal computers (PCs). Current mobile devices may offer increasingly sophisticated browsers, run on high-speed network, offer compelling graphics capabilities easier/more-intuitive user interfaces, and/or nearly continuous connectivity to global networks, such as the internet, among other things, enables end-users to do things on their mobile devices that previously had been the domain of non-mobile devices, and often on a more timely and/or frequent basis as end-user move from location to location. Recent data from some websites suggest visits to websites by mobile devices represent well over 30% of the website's web traffic. This is transforming the search experience for end-users. With current mobile devices, a user may search for a restaurant, hotel, or store while moving about their day without ever accessing a non-mobile device. While mobile devices perform basic search functions similar to those performed by non-mobile devices, the search experience is different for users using mobile devices and search engines are responding to these changes. For example, in some embodiments, search engines (e.g. Google, Bing, Yandex, Baidu) may modify search results they deliver to end-users, taking into account the types of mobile devices that end-users are searching on, type and quality of digital content suitable for display on such mobile devices, end-user location when requesting a search, physical locations associated with the digital content being searched for, and other services end-users receive from mobile devices. In these and other embodiments, the search engines may modify the search results based on the above factors to present results of digital content that includes information about a physical business relevant to the search and to a specific location of the end-user, such as, a physical address, phone number, driving directions, hours of operation, etc., for the physical business. Alternately or additionally, the search results may be arranged in a way to be suitable for display on different types of devices (including mobile devices) or in specially designed location or mobile "packs" that appear in the search results. An example of this may be a search result that includes the physical location of a store for a consumer retail product or services company (e.g., hardware store, department store, coffee shop, fast-food restaurant, etc.).

The number of content developers for these networks are increasing and accordingly, search engines, advertisers, marketers, and others are adapting to mobile devices. One difficulty with the increase in mobile technology, however, is that it is difficult for digital marketers of goods and services to cater their goods and services to the mobile search environment. Entities desire their digital content to rank/perform well in searches performed on mobile device because it may drive a significant share of their business performance and influence how end-users think about their products, services, and brands. Ranking/performing well in searches performed on mobile devices is difficult, however, with the proliferation of different mobile devices and search engines changing how they respond to searches from diverse types of mobile devices. As such, entities wanting to optimize their digital content for mobile searches may consider how their digital content may be treated by search engines when searches are performed on mobile devices. Different aspects of digital content may affect how search engines treat the digital content. Some aspects of digital content that may affect how search engines treat the digital content may be sizes of pages within the digital content, a compression ratio of pages within the digital content, a cache control setting for the server hosting the digital content, a keyword type, location information made available by the digital content, such as, by way of example and not limitation, the street address, phone number, link to a map, or driving directions all or some of which may be specially configured for different types of mobile devices, a mobile device flag within the digital content, a mobile device sub-domain within the digital content, mobile device specific content within the digital content, among others. Search engines, furthermore are increasingly customizing how location-specific search results are presented on mobile devices, which may directly affect how effectively marketers can organize their content to maximize their search results for searches performed on a location-by-location basis.

The location information made available by the digital content and presented to the search engines may also be detected and adjusted so that the right type of location information or information about a physical location (e.g., the phone number, address, physical store hours) is being provided to a search engine and that the information is correct. The information may be detected and adjusted within a search engine optimization (SEO) system, a content management system (CMS), or some other system, such as a database or data storage system.

A search engine may also be using locations to further refine search results for non-mobile devices as well as mobile devices. Search results may vary widely based on the location where the search is performed. For example, search results in one location for a keyword may produce search results with different category specific digital content, such as images, videos, news, shopping, realtime, blogs, books, places, discussions, recipes, patents, calculator, stock, timelines, and other digital content that is closely related and directed toward a certain type of digital content so as to be in a category of digital content. For example, in response to a search for burgers from a first location, the search results may have images of burgers and locations of various local burger restaurants. In another search for burgers at a second location, the search results may not include images of burgers and may include more or less locations for various local burger restaurants. In another example, references to the same burger restaurant may have different positions in the search results, based on the location where the search is performed. Alternately or additionally, adding or omitting a location in the keyword used for the search may change the search results even when the location of where the search is being performed is considered by the search engine.

Generally, embodiments disclosed herein relate to computing systems and processes used in methods for optimizing digital content for mobile search. Optimizing digital content for mobile search includes understanding user behaviors when searching on mobile devices and how network contents providers, such as application creators, and search engines among others, provide search results to mobile devices and how to adjust digital content based on user, search engine, and network content provider behavior to enhance the ability of entities to increase visibility of their websites, webpages, or other digital content in searches performed on mobile devices. In some embodiments, the optimizations that may be applied to digital content may be prioritized based on one or more factors, such as, an estimated change in position in search results when affecting an optimization, an increase in conversions or traffic at the digital content when affecting an optimization, an increase in revenue generated by the digital content when affecting an optimization, among others. In addition, additional factors for prioritizing optimizations may be determined by a web analytics system using the digital content. It should be understood that an entity may be a corporation, company, partnership, firm, organization, foundation, individual, trust, family, or otherwise that has digital content on the Internet.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1 illustrates an embodiment of a digital content auditing system 100 ("system 100), according to some embodiments described herein. The system 100 may include a network 102. In some embodiments, the network 102 may be used to connect the various parts of the system 100 to one another, such as between a correlator 104, a web server 106, a deep index engine 108, a search engine 110, a mobile search module 112, a mobile device 114, a location module 116, and a location data manager 118. It will be appreciated that while these components are shown as separate, the components may be combined as desired. Further, while one of each component is illustrated, the system 100 may optionally include any number of each of the illustrated components.

The network 102 may include the Internet, including a global internetwork formed by logical and physical connections between multiple wide area networks and/or local area networks and may optionally include the World Wide Web ("Web"), including a system of interlinked hypertext documents accessed via the Internet. Alternately or additionally, the network 102 includes one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The web server 106 may include any system capable of storing and transmitting digital content, such as webpages and other digital content. The web server 106 may provide access to the webpages of a website or other digital content on the web that may be analyzed for improving mobile or local search. For example, the web server 106 may include a computer program that is responsible for accepting requests from clients (such as web browsers), and serving them HTTP responses along with optional data contents, which may include HTML documents and linked objects for display to the user. Additionally or alternatively, the web server 106 may include the capability of logging some detailed information, about client requests and server response, to log files.

Digital content as used herein refers to any online posting, including domains, subdomains, web posts, Uniform Resource Identifiers ("URIs"), Uniform Resource Locators ("URLs"), images, videos, or other piece of content and non-permanent postings such as e-mail and chat unless otherwise specified.

The search engine 110 may be an internal or private search engine that is used for the function of producing search results. The search results produced by the search engine 110 may vary based on the requesting device or type of requesting device. For example, the search engine 110 may provide a first set of search results when a search is requested for a keyword by a standard PC/non-mobile device and a second set of search results when the search is requested for the keyword by a mobile device, such as the mobile device 114. The use of the word "keyword" herein relates to one or more words or characters that may be entered into a search engine to produce search results. As such, a keyword may be a single word such as "shoe," or a keyword may be a string of words, such as "cheap red Nike basketball shoes." As another example, the search engine 110 may provide a first set of search results when a search is requested for a keyword in a first location and a second set of search results when the search is requested for the keyword from a second location.

In some embodiments, the search engine 110 may not discriminate between devices of the same type. For example, for the same search query, a search engine 110 may provide first results to a laptop and a desktop while providing second results to different types of mobile devices. In some embodiments, the search engine 110 may further discriminate between different types of mobile devices or non-mobile devices. For example, the search engine 110 may generate results for tablets that differ from results generated for smart phones. In some embodiments, the difference between the search results generated for different requesting devices may be the presentation of the referenced digital content while the referenced digital content may be the same. Alternately or additionally, the digital content referenced in the search results may be different. In some embodiments, the search engine 110 may also change the search results based on the location of a device and whether the device is a mobile device or a non-mobile device.

The search engine 110 may generate different search results for different devices when the search engine 110 is able to determine a difference between requests received at the search engine 110. For example, a search request may indicate that the request originated at a mobile device or a non-mobile device, such as a PC, and the search engine 110 may generate results appropriate for each device. In some embodiments, a search request may not distinguish a requesting device. In these and other embodiments, the search engine 110 may send similar results to different types of devices.

In some embodiments, the search engine 110 may generate different requests for different devices based on the devices being different, but also based on different information that is received from each device. For example, a mobile device, such as the mobile device 114, may have a global positioning system (GPS) device or other device that tracks the location of the mobile device to a low level of granularity. The mobile device 114 may send its location to the search engine 110 in the search request and the search engine 110 may generate search results based on the location of the mobile device 114. By including the location of the mobile device 114 as a factor when generating the search results, the search engine 110 may generate search results that differ from search results that do not include the location, that do not include the granularity of location information, or that include the location information in a different form, such as a keyword location or the location information pulled from the mobile device 114 and not input by a user as a keyword. Alternately or additionally, the search engine 110 may generate search results based on a location that differ from search results that do not include the location, that do not include the granularity of the location information, or include the location information in a different form in non-mobile devices.

The search engine 110 may be a public search engine or a commercial search engine, such as Bing, Google, Yahoo, Yandex, Baidu, or the like.

In some embodiments, the deep index engine 108 may be configured to generate search requests using different keywords and send the search requests to the search engine 110. The deep index engine 108 may also receive the search results from the search engine 110 and crawl the search results to determine information about the search results. For example, the deep index engine 108 may be configured to crawl search results and analyze data associated with the crawl, including on-page information and back link data (e.g., back link URL, anchor text, etc.) for each digital content referenced in the search result.

In some embodiments, the deep index engine 108 may be configured to emulate different devices to cause the search engine 110 to generate results for a specific device. For example, the deep index engine 108 may emulate a mobile device and a non-mobile device and crawl search results returned by the search engine 110 for both devices. For example, the deep index engine 108 may emulate a mobile device and in some embodiments, the deep index engine 108 may be configured to emulate devices located in different locations. In these and other embodiments, the deep index engine 108 may be able to determine differences between search results that occur in different locations.

The deep index engine 108 may be further configured to determine placement of digital content in search results generated by a search engine. It is to be understood that when digital content is referenced as being in search results, the digital content itself may be in the search results, for example, an image may be in the search result. Alternately, digital content being in search results may be understood as meaning that a reference to the digital content and/or a portion of the digital content is in the search results. For example, the search results may include a reference to a website and a portion of the website for previewing on the search results, but not include the entire website on the search results.

The placement of the digital content in search results may be referred to as a ranking of the digital content in the search results, a page position of the digital content in the search result, or a pixel position of the digital content in the search results. The placement of the digital content may account for a position at which a particular search result is displayed within the search results for a search term or search term combination. The relative position of digital content within the search result may affect how the search term or search term combination affects actions of a search engine relative to search results. For example, digital content, such as a webpage, may be displayed in different locations on a search results page based on whether the search was requested from a non-mobile device or a mobile device. Alternately or additionally, digital content, such as a webpage, may be displayed in different locations on a search results page based on whether the search requested included location information about the device making the request.

The placement of digital content in search results may be dependent on numerous properties of the digital content. Some properties of the digital content that may affect the placement of the digital content in search results may include, a size of one or more of the pages of the digital content, a compression ratio of one or more of the pages of the digital content, a cache control setting for the server hosting the digital content, a keyword type, location information availability, a mobile device flag, a mobile device sub-domain, mobile device specific content, among others.

A deep index engine 108 according to some embodiments is described in more detail in copending U.S. patent application Ser. No. 13/458,978 entitled COLLECTING AND SCORING ONLINE REFERENCES, filed Apr. 27, 2012, which application is hereby incorporated by reference in its entirety. The functionalities described herein may be applied to optimizing webpages for a website.

The correlator 104 may be configured to determine how visitors are directed to digital content and how those visitors behave once they arrive at the digital content. For example, the correlator 104 may be configured to determine click through rates based on the number of visitors that arrive at the digital content from a search results page generated from searching for a keyword and the number of searches that occur using a keyword based on information received from a search engine that generates the search results page. The correlator 104 may be further configured to determine a number of conversions that occur by visitors at the digital content based on their behavior. In some embodiments, a conversion may be an action of the visitor, such as downloading a whitepaper, article, application, file, or other digital object; viewing a page; making a purchase through the digital content; associating the digital content with a social networking, approving of the digital content in a social network, placing a link to the digital content in a social network, mentioning the digital content in some social media, among others. Alternately or additionally, the correlator 104 may be configured to determine a value associated with an increase in the number of visitors at digital content, or an increase in the number of conversions for the digital content.

A correlator 104 according to some embodiments is described in more detail in co-pending U.S. patent application Ser. No. 12/574,069, filed Oct. 6, 2009 entitled CORRELATING WEB PAGE VISITS AND CONVERSIONS WITH EXTERNAL REFERENCES, which application is hereby incorporated by reference in its entirety.

The mobile search module 112 may be configured to audit digital content to determine optimizations that may be performed on the digital content to increase a placement of the digital content on search results generated for a mobile device. In particular, the mobile search module 112 may be configured to receive digital content and analyze the digital content to determine one or more properties of the digital content that relate to placement of a reference to the digital content in mobile search results. After determine the properties of the digital content, the mobile search module 112 may be configured to analyze the properties of the digital content to determine one or more optimizations to apply to one or more of the properties of the digital content to improve the placement of the reference to the digital content in the mobile search results. The mobile search module may be further configured to generate a report that includes the optimizations. In some embodiments, the audit performed by the mobile search module 112 may be referred to as a "Mobile Site Audit" of digital content.

In some embodiments, the mobile search module 112 may further be configured to provide optimization for device specific features, such as mobile application stores or "mobile app stores." As may be understood by one of skill in the art, mobile app stores include listings of applications that are specifically designed for mobile devices. Typically, these mobile app stores include search features that operate in a similar manner as a search engine, although the searches are limited to mobile applications. In order to optimize their performance in a mobile app store, an entity may need to modify their marketing strategies. For example, specific descriptions or tags may be more useful or effective in resulting in sales or downloads of a mobile app. For example, the mobile search module 112 may determine that a particular entity's mobile app comprising a chess game is underperforming in sales as compared to other mobile app chess games which offer a free or demo version of the game. Alternatively, the mobile search module 112 may determine that chess games with shorter tags are more successful than the entity's game. In other instances, the mobile search module 112 may determine that mobile apps with a larger number of user reviews result in greater sales. Hence, the mobile search module 112 may recommend to the entity a marketing program wherein end users are offered an incentive such as some form of free content if they review the game. For example, in the chess game, the entity may offer bonus content, such as specially designed pieces or game boards for users that have reviewed the game.

Other information which may be collected and analyzed by the mobile search module 112 in the mobile app setting include the number of users of a particular mobile app, the type or number of links from the app to websites or applications outside the app or the app store, the description of the product, how the app is listed in the app store versus it's search engine ranking as performed on a non-mobile.

The location module 116 may be configured to determine differences in placement in search results for digital content when the searches are conducted based on different location parameters. The location module 116 may communicate with the search engine to perform the searches based on different location parameters. In some embodiments, the location parameters may be sent to the search engine from the requesting device. In other embodiments, the search engine may have previously retrieved the location parameters from the digital content when the search engine crawled the digital content. Alternately or additionally, the search engine may retrieve the location information from another database. The search engine may place a reference to the digital content or the digital content in a search results based on the location information. Based on differences in placement for the same digital content in search results with different location parameters, the location module 116 may be configured to provide recommendations for optimizing the digital content to improve the placement of the digital content in the search results.

The location data manager 118 may be configured to manage location data for digital content. The location data may include information about at least one physical location of a business related to the digital content. For example, a website for a restaurant may include location data that may include information about the physical locations of the restaurant. The location data may include various fields and may be managed by a content management system that generates the website or by a third party website. The location data manager 118 may be configured to access and check the location data for accuracy, correct formatting, and correct data fields and to update the location data.

Figure 2:
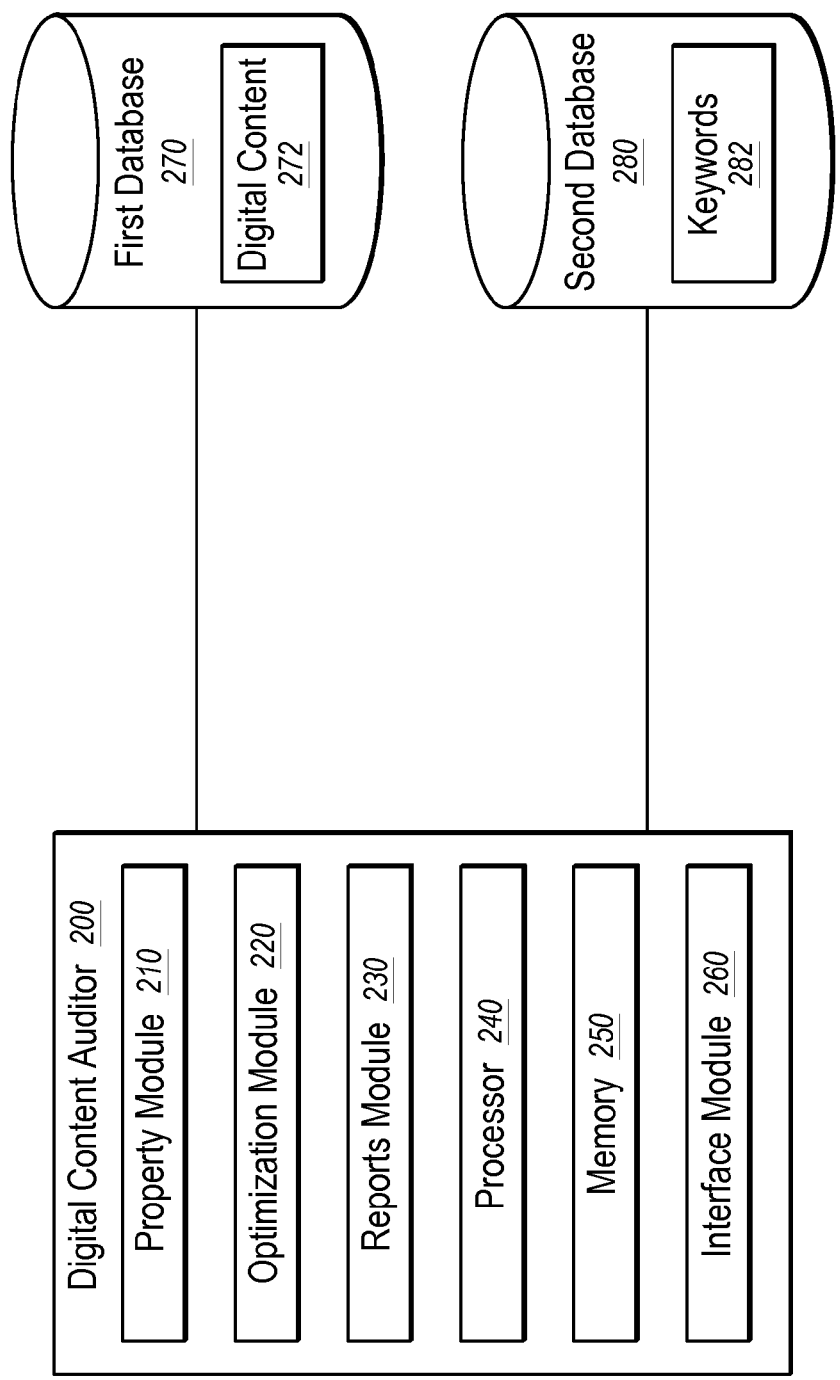
FIG. 2 is a block diagram of an example digital content auditor.

FIG. 2 is a block diagram of an example digital content auditor 200, according to some embodiments described herein. The digital content auditor 200 may be communicatively coupled to first and second databases 270, 280 directly or indirectly through a network or through one or more other devices. The digital content auditor 200 may include, but is not limited to, a property module 210, an optimization module 220, a reports module 230, a processor 240, a memory 240, and an interface module 250. The digital content auditor 200 may be configured so that the property module 210, the optimization module 220, the reports module 230, the processor 240, the memory 250, and the interface module 260 may communicate with each other and share information. The first database 270 may include digital content 272 and the second database 280 may include keywords 282.

The digital content 272 may be any digital content that is available over a network, such as the internet. In some embodiments, the digital content 272 may be a website with multiple pages and sub-domains. In some embodiments, the digital content 272 may be a blog, a video, an image, or some other type of digital content that may be stored on a network or available through secured channels or public channels of the internet.

In some embodiments, the first database 270 may be part of a system that includes the digital content auditor 200. In these and other embodiments, the digital content 272 may be sent to the digital content auditor 200 over a network or sent directly to the digital content auditor 200. In some embodiments, the first database 270 may be remote from the digital content auditor 200. In these and other embodiments, the digital content 272 may be sent to the digital content auditor 200 during a secured or non-secured file transfer. For example, the digital content 272 may be a webpage and the digital content auditor 200 may receive both the public and non-public portions of the digital content 272 through a file transfer. In some embodiments, digital content auditor 200 may access the digital content 272 in the first database 270 through navigating to the digital content 272 through the internet and accessing the publically available portions of the digital content 272. For example, the digital content 272 may be a webpage and the digital content auditor 200 may receive the digital content 272 in the same manner as any user of the internet may access the digital content 272.

The property module 210 may be configured to receive the digital content 272 from the first database 270. The property module 210 may be further configured to analyze the digital content 272 to determine properties of the digital content 272 that relate to placement of a reference to the digital content 272 in search results generated for a mobile device. Various properties that may relate to placement of a reference to the digital content 272 in search results generated for a mobile device may include one or more of the following: a size of one or more pages of the digital content, a compression ratio of one or more pages of the digital content, a cache control setting for the server hosting the digital content, a keyword type within the digital content, location information availability, a mobile device flag, a mobile device sub-domain, and mobile device specific content. The various properties may be determined by analyzing the digital content. For example, the html code or other code and other aspects of a website may be analyzed to determine the properties of the website.

The size of one or more pages of the digital content 272, the compression ratio of one or more pages of the digital content 272, and the cache control setting for the server hosting the digital content 272 may relate to the load times for the digital content 272. The amount of time for a device to load the digital content 272 may relate to how a search engine places the digital content 272 or a reference to the digital content 272 on a search results page. For example, mobile devices and their communication speeds are typically longer than communication speeds with non-mobile devices, and as such, websites or applications that are more difficult to load on mobile devices may under-perform.

The keyword type property may include information about the keywords contained within the digital content 272 that may be used by a search engine to associate the digital content with a search being performed by the search engine. For example, a search may be performed for the keyword "shoes." When the digital content 272 includes a reference to "shoes" and the search engine is aware that the digital content 272 includes the reference to "shoes" the search engine may display the digital content 272 or a reference to the digital content 272 in a search results that it generates. Other factors, beside the digital content 272 listing the keyword may be considered by the search engine in determining whether to include the digital content 272 or a reference thereto on the search results that the search engine generates.

The keyword type property may include various keyword properties. The property module 210 may analyze the digital content 272 to determine if the keywords in the digital content include the keyword type properties. In some embodiments, the digital content 272 including a keyword type property may be the digital content 272 having a particular keyword within the digital content 272. For example, the keyword properties may include the lengths of keywords and keywords associated with an auto-complete feature used by a mobile device. In these and other embodiments, the digital content 272 may have these keyword properties by having the keywords of proper length and having keywords that are associated with an auto-complete feature used by a mobile device. In some embodiments, the digital content 272 including a keyword type property may be the keywords in the digital content 272 that are associated with other aspects of the digital content 272, such as location information in the digital content 272.

Keyword length may be meaningful because mobile users using the keyboards provided by most mobile devices may be less inclined to enter long or highly detailed keywords since the keyboards are more difficult to use than keyboards typically attached to most non-mobile devices. Thus, for digital content to be presented in mobile search results, keywords lengths in the digital content may need to correspond with length of keywords entered on a mobile device.

Keywords associated with an auto-complete feature used by a mobile device may also be meaningful because mobile devices may prompt user to complete phrases because of the increased difficulty in entering words into mobile devices. An auto-complete feature may also include a predictive word search feature and a predictive phrase search feature. For example, although a user would typically enter an entire keyword search of "women's heels" using a non-mobile device, the same user may see the phrase "women's shoes" appear as a predictive search after entering "women's" and may elect to have the predictive search performed rather than taking the effort to enter the second term.

The property module 210 may analyze the digital content 272 to determine if word patterns that result from use of auto-complete/predictive search/predictive phrase suggestions that are typically installed and operating on mobile devices are in the digital content 272.

The property module 210 may determine if the digital content 272 includes the location information availability property. The digital content 272 may include the ability to provide a search engine with locations that are associated with the digital content 272. When a search engine crawls or otherwise determines information about the digital content 272, the digital content 272 may provide location data to the search engine so that the search engine associates the digital content 272 with that location. As a result, when a search is conducted that includes a location parameter, the search engine may generate search results that include the digital content 272. For example, the digital content 272 may be a website for a burger place in Oakland, Calif. For a search conducted for "burger Oakland," the website may not be identified by the search engine if the digital content 272 had not indicated to the search engine that the digital content was associated with Oakland.

The property module 210 may determine if the digital content 272 includes the mobile device flag property. A mobile device flag may be included in digital content to indicate when the digital content is being requested by a mobile device. For example, the mobile device flag may be a process that analyzes a request for digital content from a device to determine when the request is from a mobile device. When the mobile device flag determines that the request is from a mobile device, the mobile device flag may indicate certain portions of the digital content be provide to the mobile device or direct the request to certain portions of the digital content. For example, when digital content is a website, the website may have a sub-domain with webpages designed for mobile devices (e.g. m.dot). or specific content designed for mobile devices that is applied using cascading style sheets. When the website detects a mobile device is requesting the website, the website may direct the mobile device to the mobile sub-domain or apply cascading style sheets for mobile devices to the content being sent to the mobile device.

The property module 210 may indicate to the optimization module 220 what properties the digital content 272 includes. The optimization module 220 may be configured to determine optimizations that may be applied to the digital content 272 based on the properties of the digital content 272. In some embodiments, the optimization module 220 may determine the optimizations that may be applied to the digital content 272 based on the properties that the digital content 272 is lacking.

For example, the digital content 272 may lack a mobile device flag. The optimization module 220 may determine that an optimization for the digital content 272 may be to add a mobile device flag.

In some embodiments, the optimization module 220 may also review the keywords types present in the digital content 272. In these and other embodiments, the optimization module 220 may retrieve database keywords 282 from the second database 280 and compare the keywords in the digital content 272 with the database keywords 282. When the optimization module 220 determines that the digital content 272 lacks a keyword from the database keywords 282, an optimization for the digital content 272 may be to include the keyword that is lacking. The database keywords 282 used by the optimization module 220 may vary based on the type of digital content being optimized. For example, based on locations associated with the digital content the keywords may be different.

In some embodiments, the optimization module 220 may be further configured to optimize portions of the digital content 272 based on the properties detected by the property module 210. For example, the optimization module 220 may determine that the database keywords 282 be added to the portions of the digital content 272 that are configured to be sent to mobile devices and not on other portions of the digital content 272. The database keywords 282 may be managed by a keyword manager. A keyword manager is described further with respect to FIG. 4.

The reports module 230 may be configured to receive optimizations for the digital content 272 from the optimization module 220 and present the optimizations in a report. The report may be sent to an entity that controls the content of the digital content 272 to allow the entity to adjust the content of the digital content 272. In some embodiments, the reports module 230 may be configured to generate recommendations based on the optimizations from the optimization module 220 and include the optimizations in the report. Alternately or additionally, the recommendations may be displayed to an entity outside of the report that presents the optimizations. In some embodiments, the optimizations and/or recommendations may be prioritized based on web analytics collected regarding the digital content 272, as explained hereafter.

In some embodiments, the recommendations may be sent to a secondary system, such as a content management system or a database that manages the digital content 672. In some embodiments, the recommendation may be sent to the secondary system, automatically and directly. In some embodiments, the recommendations may be sent through an application programming interface or by accessing the secondary system through other protocols, such as directly through interface of the secondary system.

The processor 240 may be configured to execute computer instructions that cause the property module 210, the optimization module 220, and the reports module 230 to perform the functions and operations described herein. The computer instructions may be loaded into the memory 250 for execution by the processor 240 and/or data generated, received, or operated on during performance of the functions, and operations described herein may be at least temporarily stored in the memory 250.

The interface module 260 may be configured to receive data from and/or to send data to other systems, users, and/or other processes over any type of communications network. In some embodiments, the interface module 260 may be configured to receive the digital content 272 and to store the digital content 272 in the database 270 and/or the memory 250.

The property module 210, the optimization module 220, and the reports module 230 may each be implemented in any suitable manner, such as a program, software, library, application, script, function, software-as-service, analog or digital circuitry, or any combination thereof. Modifications, additions, or omissions may be made to the digital content auditor 200 without departing from the scope of the present disclosure. For example, the digital content auditor 200 may be configured to have any number of different modules that assist in auditing digital content.

Figure 3:
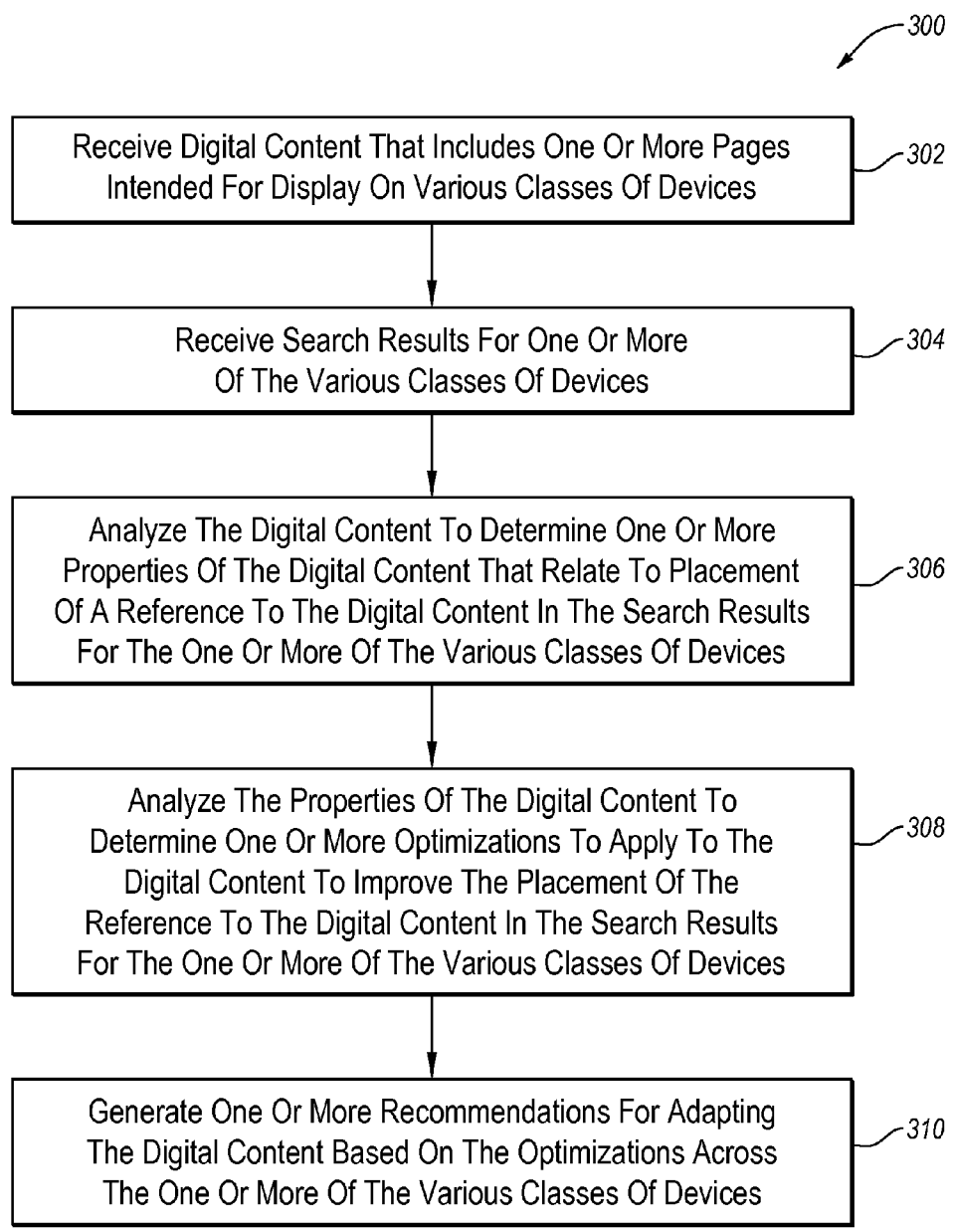
FIG. 3 is a flowchart of an example method of optimizing digital content for searches performed on mobile devices.

FIG. 3 is a flowchart of an example method 300 of optimizing digital content for searches performed on mobile devices according to some embodiments described herein.

The method 300 may be implemented, in some embodiments, by a digital content auditor, such as the digital content auditor 200 of FIG. 2, for instance. Although illustrated as discrete blocks, various blocks may be divided into additional blocks, combined into fewer blocks, or eliminated, depending on the desired implementation.

The method 300 may begin at block 302, where digital content that includes one or more pages may be received. In some embodiments, the digital content may be a website and the one or more pages may be webpages of the website. In block 304, search results for one or more of the various classes of devices may be received.

In block 306, the digital content may be analyzed to determine one or more properties of the digital content that relate to placement of a reference to the digital content in the search results for the one or more of the various classes of devices. In some embodiments, the placement in the mobile search results may include a ranking of the digital content in the mobile search results, a page position of the digital content in the mobile search results, a pixel position of the digital content in the mobile search results, among others.

In block 308, the properties of the digital content may be analyzed to determine one or more optimizations to apply to the digital content to improve the placement of the reference to the digital content in the in the search results for the one or more of the various classes of devices. In some embodiments, the one or more properties of the digital content may include a size of one or more of the one or more pages, a compression ratio of one or more of the one or more pages, a cache control setting for the server hosting the digital content, a keyword type, location information availability, a mobile device flag, a mobile device sub-domain, mobile device specific content, among others.

In some embodiments, the keyword type property may include lengths of keywords, keywords associated with an auto-complete feature used by a mobile device, keywords associated with a location on the digital content, among others. In some embodiments, the auto-complete feature used by the mobile device may include a predictive word search feature and a predictive phrase search feature.

In some embodiments, the mobile device flag property may include the digital content being configured to redirect a server to one or more of the pages of the digital content configured for a device that requested the digital content. For example, the device that requested the digital content may be a mobile device and the one or more of the pages of the digital content configured for the mobile device may include the mobile device sub-domain and the mobile device specific content. In these and other embodiments, the mobile device may be a tablet, a smart phone, a feature phone, a storage device, a music device, a gaming device, among other mobile devices. In block 310, one or more recommendations may be generated for adapting the digital content based on the optimizations across the one or more of the various classes of devices.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, when the property of the digital content includes a keyword type, the method 300 may further include generating a keyword location map that rates search performances of keywords based on search locations, where one of the optimizations to apply to the digital content includes the inclusion of a keyword from the keyword location. In these and other embodiments, the search performance of the keywords may be based on the search volume of the keywords.

In some embodiments, when the property of the digital content includes location information and when analyzing the location information when the digital content includes location information, the method 300 may further include determining when the location information includes one or more of the following fields: an address field, a business hours field, a map field, a directions field, a phone number field, a customer review field, among other fields.

In some embodiments, when the property of the digital content includes location information and when analyzing the location information when the digital content includes location information, the method 300 may further include searching second digital content separate from the digital content for the location information where the second digital content is operated by a third party. For example, the second digital content may be a database and may be operated by Yelp, Foursquare, CitySearch, Google places, Google+ Local, or some other third party that collects and stores information and physical locations of business with digital content. In these and other embodiments, the method 300 may further include analyzing the location information at the second digital content for format and accuracy. In some embodiments, one of the one or more optimizations to apply to the digital content may include updating location information.

In some embodiments, the method 300 may be performed by a first system. In these and other embodiments, the method 300 may further include automatically and directly inputting the recommendation from within the first system into a second system through a direct interface or an application specific interface. In these and other embodiments, the second system may be a database or a content management system and the first system may be a search engine optimization platform.

An example of optimizing digital content for searches performed on a mobile device is as follows. An entity, such as a company that manufactures shoes may have a company website on the Internet. The entity may also have images of shoes and other digital content that displays their shoes, such as specific pairs of shoes and their corresponding price, that are available over the internet and searchable by search engines. A website may be received and analyzed to determine the properties of the website. It may be determined that the website has a listing of keywords, a mobile device flag that directs users from mobile devices to a mobile device domain with content optimized for the mobile device, and a page size and compression ratio of the pages. The properties are then analyzed. For example, if it is determined that the amount of pages or the size of the pages is so vast that there was a delay in the amount of time it took for a mobile user to download or display the pages as compared to websites of the entity's competitors, an optimization may be to reformat pages to be more compatible with a mobile device. In other instances, the analysis may indicate that location specific keywords, shorter keywords, or keywords which are aligned with predictive keyword searches produced on mobile devices that are not part of the website be included on the website.

Figure 4:
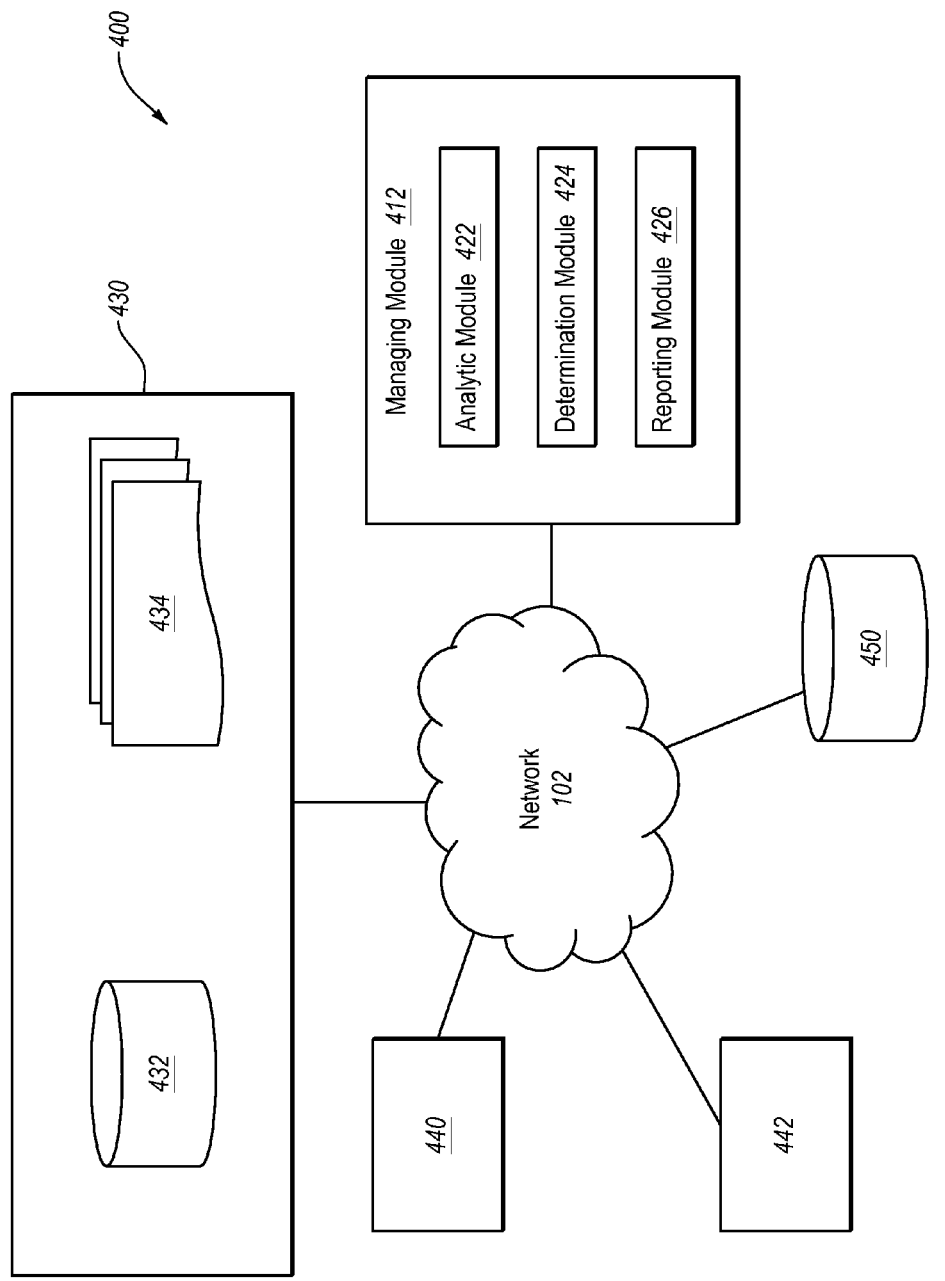
FIG. 4 illustrates an example keyword manager.

FIG. 4 illustrates an example keyword manager 400 arranged according to some embodiments described herein. The keyword manager 400 may include the network 102 operably coupling a managing module 412, a search result computing system 430, a location selector 440, a search engine 442, and a keyword database 450. It will be appreciated that while these components are shown as separate, the components may be combined as desired. Further, while one of each component is illustrated, the keyword manager 400 may optionally include any number of each of the illustrated components.

The managing module 412 may be configured to manage keywords for use in optimizing digital content for searches performed on mobile devices and/or for other functions. The managing module 412 may include submodules for implementing particular functionalities. The managing module 412 may be generic to and include an analytic module 422, determination module 424, and a reporting module 426.

The search result computing system 430 may include a search results database 432 that may store one or more search results 434, which may include search results from the search engine 442 as well as digital content included in or referenced by the search results. Alternatively or additionally, the search results database 432 may also store data collected from the one or more search results 434.

The search results computing system 430 may be configured to obtain the search results 434 by initiating a search to be performed by the search engine 442 using one or more keywords found in the search term database 450. In some embodiments, the search results computing system 430 may be configured to search using keywords resulting from an auto-complete feature, a predictive word search feature, and/or a predictive phrase search feature of a mobile device. In some embodiments, the keywords may be keywords not associated with an auto-complete feature, a predictive word search feature, and/or a predictive phrase search feature of a mobile device.

The search results computing system 430 may be configured to obtain the search results 434 by initiating a search to be performed by the search engine 442 using one or more locations found in the search term database 450 for each of the one or more keywords in the database. The location selector 440 may select a location for which the search may be performed. For example, the location selector 440 may select a geographic area, such as a country, state, region, metropolitan area, city, neighborhood, or zip code for which the search may be performed by the search engine 442. In some embodiments, to select the location for which the search may be performed, the search selector 440 may adjust one or more settings of the search engine 442 that allow a location where the search is to be performed to be set. In other embodiments, to select the location for which the search may be performed, the search selector 440 may select servers that are located in the selected location for performing the search. Alternately or additionally, the search selector 440 may send signals to the search engine 442 to cause the search engine 442 to associate a location with the search. These signals may include information such as an IP address, GPS coordinates, mobile tower identifiers in a wireless communication system, names of the cities along with the keywords, among others.

An example of a location-based search is as follows: a user performing a search in San Francisco may select a setting in a search engine to indicate that the search is being performed in San Francisco. This may allow the search engine to customize searches for the user. For example, a search for the search term "pizza places" may produce results for pizza places in random locations if a location is not set in a search engine. In contrast, if a location is set in a search engine, either by a user or automatically by the search engine based on an IP address of the user or other information, such as a term in the search string, the search results provided by the search engine may include pizza places near the location where the search is performed.

In some embodiments, the search results obtained from the search engine may vary according to previous searches performed by a user. For example, in some embodiments, a search engine may consider a profile of a user when generating the search results. In some embodiments, the profile of a user may be based on a previous search history occurring at the same IP address or MAC address. For example, the profile of a user may be based on a previous search history of the user as determined by cookies or other digital information stored on an electronic device upon which the user performs a search. In some embodiments, the profile of a user may be based on a previous search history stored on a server. For example, a user may be registered with a search engine and the search engine may store a history of the searches of the user. In some embodiments, the profile of a user may be based on the previous search history of the user generated during a current search session. For example, if a user performed a first search and then performed a second search related to the first search based on the results from the first search, the results generated by the search engine for the second search may be based on the first search performed by the user.

In some embodiments, the search results computing system 430 may be configured to obtain the search results 434 by requesting a search to be performed by the search engine 442 with the search results computing system 430 acting as one of multiple types of devices. For example, the search results computing system 430 may send the request to the search engine 442 acting as a mobile device or a non-mobile device. Alternately or additionally, the search results computing system 430 may send the request to the search engine 442 acting as a particular type of mobile device, such as a smart phone or a feature phone.

In some embodiments, the search results computing system 430 may obtain multiple search results 434 based on numerous search configurations that may be sent to the search engine 442. For example, for each device or groups of devices searches may be performed with varying locations and varying keywords to obtain the search results 434.

Information about the search results 434 may be collected by crawling the search results 434. In some embodiments, the search results 434 may be crawled using a deep index engine, such as the deep index engine 108 of FIG. 1. In some embodiments, the search results 434 may be crawled using a different mechanism. In some embodiments, the information about the search results 434 may be collected in a different method.

Referring again to the managing module 420, the analytic module 422 may be configured to analyze the information for each of the search results 434. The analytic module 422 may include one or more algorithms for analyzing the information from the search results 434. For example, the analytic module 422 may analyze information from each of the search results 434 to identify if the search results 434 contain references to digital content. Additionally or alternatively, the analytic module 422 may correlate the search results 434.

The determination module 424 may include one or more algorithms for processing data obtained from the analytic module 422. For example, using the data provided by the analytic module 422, the determination module 424 may be configured to determine a position for digital content or a reference to digital content in each of the search results 434 or a subset of the search results 434. Additionally or alternatively, the determination module 424 may be configured to determine a number of searches performed on a search engine for one or more keywords from a first location. Additionally or alternatively, the determination module 424 may be configured to determine a number of searches performed on a search engine for one or more keywords from a first location where one or more of the search terms is a second location. For example, the determination module 424 may be able to determine a number of searches being performed for a keyword "hotels in New York," from Chicago or some other location. The determination module 424 may be able to determine a number of searches being performed based on information received from the search engine 442. For example, the search engine 442 may publish information regarding the frequency of searches performed using the keyword "hotels in New York," along with other information regarding searches performed in specific locations allowing the determination module 424 to determine the number of searches being performed.

The reporting module 426 may compile information from the analytic module 422, the determination module 424, or both to generate a report and make recommendations regarding keyword performance based on location, type of keyword, types of device, among other things. The keyword performance may be based on a position of digital content related to an entity in a search result. Thus, a keyword that generates a search result with digital content in the search result in a better position than another keyword may be deemed to have a better keyword performance.

As an example report, the reporting module 426 may be configured to generate reports that compare the performance of keywords that result from auto-complete features, predictive word search features, and/or a predictive phrase search feature to keywords that are not of this keyword type in searches performed by mobile devices. Based on this information, the managing module 412 may be configured to provide keywords to digital content to optimize the digital content for searches performed by mobile devices, as described with respect to FIG. 3.

In some embodiments, the reporting module 426 may be configured to generate reports that compare the performance of keywords at locations with different levels of granularity. For example, the reporting module 426 may be able to report on the keyword performance across different cities, metropolitan areas, zip codes, or other areas. Based on the report, the managing module 412 may suggest different keywords be associated with different locations to optimize digital content for searches performed by mobile devices, as described with respect to FIG. 3.

In some embodiments, the reporting module 426 may be configured to generate reports that compare the performance of keywords across different types of devices. For example, the reporting module 426 may report on the performance of different keywords in non-mobile devices and mobile devices.

In some embodiments, the reporting module 426 may also be configured to generate reports that indicate search volume of keywords based on the geographic location where the search is performed. In these and other embodiments, the reports may highlight locations where numerous searches are being performed for a particular keyword. In these and other embodiments, the managing module 412 may suggest the use of the high volume keywords for a location be associated with content associated with the location to increase the ability of digital content to appear in a search result. For example, a website may be associated with restaurant in New York. A local news report may have spotlighted the restaurant in a top 10 list. The top 10 list may be keyword that receives multiple searches in New York. The managing module 412 may indicate that the website for the restaurant include the keyword of the top 10 list to increase the likelihood of the website for the restaurant being part of a search result.

In other embodiments, the managing module 412 may perform Click-Through Rate (CTR) tracking that compares and distinguishes CTRs on mobile devices vs. non-mobile devices. Such a system could use that information combined with other information to deliver performance reporting for broader web management.

Figure 5:
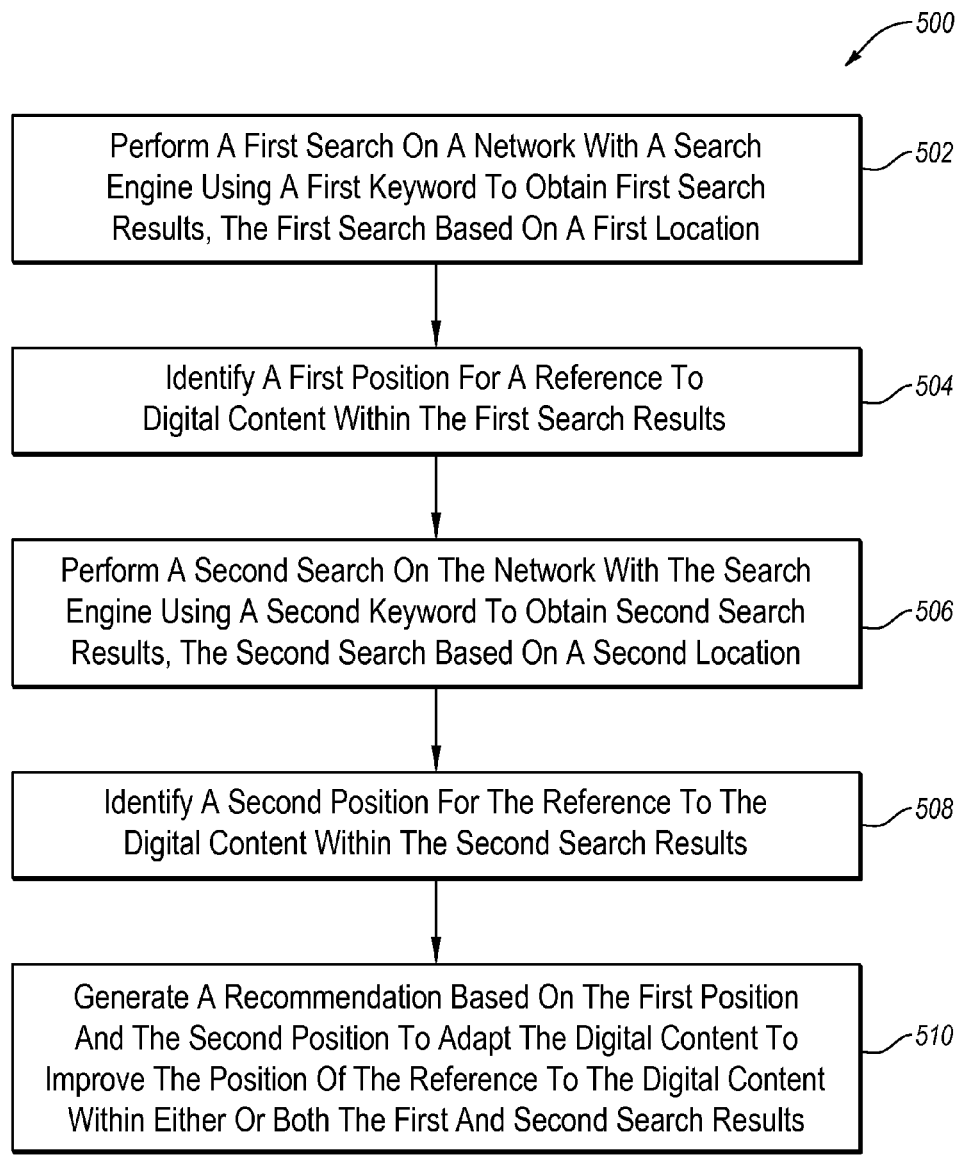
FIG. 5 is a flowchart of an example method of search engine optimization based on location.

FIG. 5 is a flowchart of an example method 500 of search engine optimization based on location, according to some embodiments described herein. The method 500 may be implemented, in some embodiments, by a managing module, such as the managing module 412 of FIG. 4, for instance. Although illustrated as discrete blocks, various blocks may be divided into additional blocks, combined into fewer blocks, or eliminated, depending on the desired implementation.

The method 500 may being at block 502, where a first search on a network with a search engine using a first keyword may be performed to obtain first search results where the first search is based on a first location. The first search being based on the first location may indicate that the first location is a parameter used by the search engine when conducting the first search. In block 504, a first position for a reference to digital content within the first search results may be identified.

In block 506, a second search on the network with the search engine using a second keyword may be performed to obtain second search results where the second search is based on a second location. In some embodiments, the first and second locations may be the same type of locations. For example, both of the first and second locations may be one of the following: countries, cities, metropolitan areas, neighborhoods, zip codes, states, providence, countries, or regions. Alternately, one of the first and second locations may be one of the above listed types of locations and another of the first and second locations may be another of the above listed types of locations. For example, the first location may be a zip code and the second location may be a city.

In some embodiments, the first search and the second search may be performed using a mobile device or a non-mobile device. In some embodiments, the first location may in a first country and the second location may be in a second country different from the first country. For example, the first location may be in the United States and the second location may be in France.

In some embodiments, the first keyword may be the same as the second keyword and the first and second keywords may not include the first location and the second location. In these and other embodiments, the device requesting the search may indicate its location to the search engine so that the search engine may include the device's location within the search parameters when performing the search. Alternately or additionally, the first keyword may include the first location and the second keyword may not include the location. In these and other embodiments, the device may provide its location when requesting the second search and not the first search.

In some embodiments, either or both of the first keyword and second keyword include a group of keywords. In these and other embodiments, a search may be performed and a position located for the reference to the digital content for each of the keywords in the group.

In block 508, a second position for the reference to the digital content within the second search results may be identified. In some embodiments, the first position and the second position may be a rank of the reference to the digital content within the first and second search results. In some embodiments, the second position and the first position may be the same. Alternately or additionally, the second position and the first position may be different.

In block 510, a recommendation based on the first position and the second position may be generated to adapt the digital content to improve the position of the reference to the digital content within either or both the first and second search results. Adapting the digital content may include adjusting one or more aspects of the digital content by changing, adding, and/or deleting one or more of the following: content, links, html headers, data within the html headers, among other content. Alternately or additionally, adapting the digital content may include adjusting location data for the digital content. For example, the location data for the digital content may be accessed and analyzed to determine various properties about the location data and corrections may be made to the location data. More information about accessing, analyzing, and correcting location data is explained with reference to FIGS. 6 and 7. In some embodiments, in block 510 a report may be created to illustrate the first position and the second position for the keywords.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include performing multiple searches on the network where each of the multiple searches is performed using the keyword to obtain a plurality of search results. Each of the multiple searches may be based on a different location and/or a different keyword. In some embodiments, the locations may be randomly assigned. In some embodiments, the locations may be preselected based on a user input. The number of multiple searches may be large, for example, the number of multiple searches may be greater than 1,000, 10,000, 100,000, or more. The method 500 may further include identifying a position for the reference to the digital content within each of the plurality of search results and generating the recommendation based on the first position, the second positions, and the position for each of the plurality of search results. In some embodiments, the method 500 may not include generating the recommendation. In some embodiments, the method 500 may include generating a report that illustrates the positions for each of the keywords at each of the different locations. Providing a report that illustrates the positions for each of the keywords may allow for analysis to be performed to understand digital content and how search engines are searching and dealing with the digital content.

In some embodiments, the method 500 may be performed by a first system. In these and other embodiments, the method 500 may further include automatically and directly inputting the recommendation from within the first system into a second system through a direct interface or an application specific interface. In these and other embodiments, the second system may be a database or a content management system and the first system may be a search engine optimization platform.

In some embodiments, the method 500 may further include generating multiple recommendation based on the first position and the second position to adjust an aspect of the reference to the digital content to improve the position of the reference to the digital content within either or both the first and second search results. In some embodiments, the multiple recommendations may be prioritized based on web analytics collected regarding the reference to the digital content. In these and other embodiments, the web analytics may be collected by a deep index engine and/or a correlator, such as the deep index engine 108 and the correlator 104 of FIG. 1. In these and other embodiments, the web analytics may include a number of visits to the reference to the digital content, a number of conversions per visit, among other metrics. Based on these metrics, the recommendation that may result in the greatest increase in traffic, conversions, revenue, or some other metric may be given priority over other recommendations.

In some embodiments, the method 500 may further include identifying a third position for a reference to other digital content within the first search results. The other digital content may be controlled and operated by an entity that is different than the entity that controls and operates the digital content. In some embodiments, the entity that controls and operates that other digital content may be a competitor of the entity that controls and operates the digital content.

In these and other embodiments, the method 500 may further include identifying a fourth position for the reference to the other digital content within the second search results and comparing the third and fourth positions to the first and second positions, respectively. When one of or both of the third and fourth positions are higher than the first and second positions, respectively, or in other circumstances, for example when both the third and fourth positions are lower than the first and second positions, the method 500 may include generating a recommendation to adapt the digital content to include location data similar to location data associated with the reference to the other digital content.

An example of the method 500 follows: a business, such as a restaurant may have digital content, such as a website that provides users of the website with information about the restaurant and location information about different physical locations of the restaurant. The restaurant may have physical locations across the world. Using the method 500, the restaurant may gain insights into how the restaurant's website is performing in organic searches performed in different locations. For example, the website may rank fourth when a search for "best steak restaurants" is conducted in Miami and rank twelfth when a search for "best steak restaurants" is conducted in Chicago. By understanding the difference in rankings, the website may be adapted to improve the rankings in Chicago. In some instances, the search result rankings of the restaurant's website in different locations may be compared with a competitor's restaurant's website search results rankings in the same locations. The restaurant's website may be adapted to include aspects of the competitor's restaurant's website when the competitor's restaurant ranks higher than the restaurant's website in the search results. For example, the restaurant's website location data may be made to match the location data of the competitor's restaurant's website.

Figure 6:
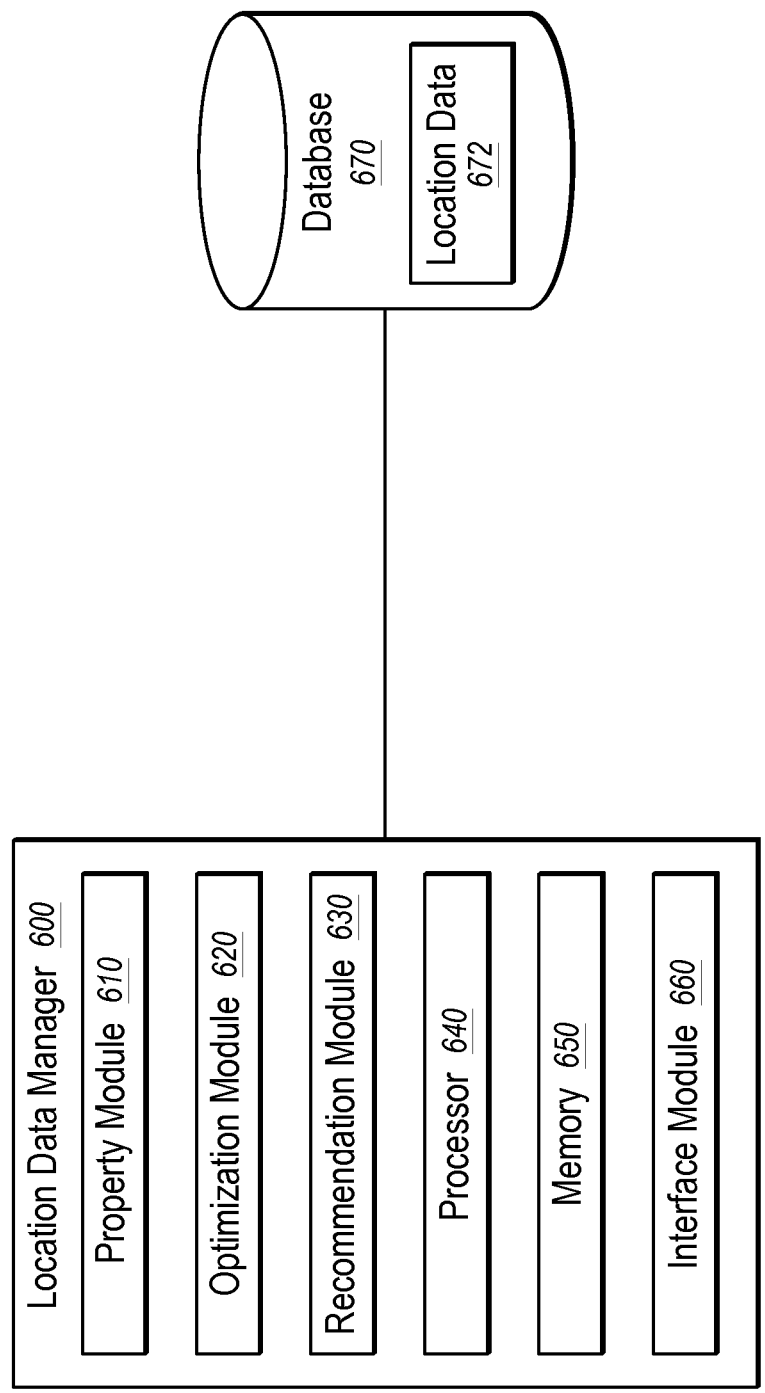
FIG. 6 is a block diagram of an example location data manager.

FIG. 6 is a block diagram of an example of a location data manager 600, according to some embodiments described herein. The location data manager 600 may be communicatively coupled to a database 670 directly or indirectly through a network or through one or more other devices. The location data manager 600 may include, but is not limited to, a property module 610, an optimization module 620, a recommendation module 630, a processor 640, a memory 640, and an interface module 650. The location data manager 600 may be configured so that the property module 610, the optimization module 620, the recommendation module 630, the processor 640, the memory 650, and the interface module 660 may communicate with each other and share information. The database 670 may include location data 672.

The location data 672 may be data associated with a physical location of a business, corporation, or some other entity. In some embodiments, the location data 672 may be located on the digital content of the business, the corporation, or the some other entity. In some embodiments, the location data 672 may be include in different digital content, such as a website that includes location data for different business, for example, Google+ local, Yelp, CitySearch, among others. The location data 672 may include various fields. For example, the location data 672 may include a phone number field for a phone number of the physical location. Alternately or additionally, the location data 672 may include an address field for the physical address, a map field for a map that includes the physical address, a direction field for providing directions to the physical address, a business hours field for the hours of operations at the physical location, a customer review field for the physical location, among other fields. For example, a website for a retail store may have location data, such as the address of one or more of the retail stores on the website and the hours of operation for that retail store.

In some embodiments, the database 670 may be part of a content management system that generates the digital content that may contain the location data. In these and other embodiments, the location data 672 may be a data store or file that provides the information for the digital content to the content management system. Adjusting the data store or file may result in the digital content being adjusted. In these and other embodiments, the location data manager 600 may be part of the content management system or may be able to link with the content management system.

In some embodiments, the database 670 may be part of a system that is separate from the system that manages or provides the digital content associated with the location data 672. In these and other embodiments, the database 670 may be controlled and operated by a third party. For example, the database 670 may be part of a website that provides location data 672 for physical business, such as Yelp, Google+ Local, CitySearch, or some other entity on the internet. In these and other embodiments, the location data manager 600 may be configured to network with the database 670 to allow the location data manager 600 to retrieve location data from and send location data to the database 670.

In some embodiments, the property module 610 may be configured to receive the location data from the database 670. For example, the property module 610 may be part of a content management system that includes the location data 672. In these and other embodiments, the property module 610 may access the files with the location data 672. In some embodiments, the property module 610 may access the location data 672 by crawling a third party digital content. For example, the property module 610 may crawl Yelp or some other website that provides the location data 672 to access the location data 672.

The property module 610 may also be configured to analyze the location data 672 to determine the properties of the location data 672 that relates to placement of a reference to the digital content in location specific search results. Location specific search results may be search results that are at least partially based on a location parameter that is considered when generating the search results. For example, a mobile device may request a search for burgers and send an indication of its current location. The search engine may conduct a search for burgers that includes the parameter of the mobile device's current location and generate results based on the parameter, for example, burger places near to the physical location of the mobile device. If digital content does not properly include location information, the search engine may not display the digital content in the search results.

The various properties may be determined by analyzing the digital content. For example, the html code or other code and other aspects of a website may be analyzed to determine the properties of the website.

The various properties of the location data 672 that may be determined by the property module 610 include, but are not limited to, accuracy of the location data 672, data field types, and data field formatting. The data field types may include, but is not limited to, those previously discussed, such as a phone number field, an address field, a map field, and a business hours field. The data fields that are available in the location data 672 may affect how a search engine may treat digital content associated with the location data 672. For example, a search engine may give preferential treatment to digital content that is associated with the location data 672 that includes a map field and an address field. When digital content does not include one of these two fields, the digital content may not be placed in search results or in a worse position in the search results.

The accuracy of the location data property may relate to the accuracy of the location data 672. One or more of the fields of the location data 672 may change for one or more physical locations of a business. The accuracy of the location data property may pertain to how accurate the location data 672 is.

The data field formatting may relate to how the location data 672 is formatted. For example, for the phone number field, the phone number may include an area code, a country code, a leading one, a dash between number groupings, among other formatting issues for a phone number. The formatting of the data fields may affect how a search engine may treat the data fields. For example, a data field that is incorrectly formatted may not be considered by as search engine resulting in the digital content associated with the data field not being displayed in search results generated by the search engine.

The property module 610 may indicate to the optimization module 620 what properties the location data 672 includes. The optimization module 620 may be configured to determine optimizations that may be applied to the location data 672 based on the properties of the location data 672. In some embodiments, the optimization module 620 may determine the optimizations that may be applied to the location data 672 based on the properties that the location data 672 is lacking.

For example, the optimization module 620 may determine an optimization to be adjusting the format of one or more of the location data fields. In some embodiments, the optimization module 620 may receive indications of optimizations to perform from the interface module 660. These indications may be based on comparisons between location data of the digital content and location data of other digital content. The other digital content may be digital content controlled by a competitor or other digital content of the entity. In some embodiments, the other digital content may be placed higher in search results than the digital content. In these and other embodiments, the optimization module 620 may receive an indication of the location data for the other digital content. Based on the properties of the digital content, the optimization module 620 may determine optimizations for the location data 672 of the digital content so that the location data is more analogous to or conforms more closely with the location data of the other digital content. For example, the location data of the other digital content may include stores hours and the location data 672 of the digital content may not include store hours. An optimization may be to include the store hours in the location data 672.

In some embodiments, the optimization module 620 may make the optimizations to the location data 672 directly. For example, the optimization module 620 may send new location data to the database 670. For example, the optimization module 620 may re-write a file in a content management system to make the optimizations to the location data 672. Alternately or additionally, the optimization module 620 may interface with the database 670 when the database 670 is controlled by a third party and present the new location data 672 to the database 670.

The recommendation module 630 may be configured to receive optimizations for the location data 672 from the optimization module 620 and present the optimizations in a report or to generate recommendations regarding optimizing the location data. The report may be sent to an entity that controls the content of the location data 672 to allow the entity to adjust the content of the location data 672. In some embodiments, the recommendations may be sent to a secondary system, such as a content management system or a database that manages the location data 672. In some embodiments, the recommendation may be sent to the secondary system, automatically and directly. In some embodiments, the recommendations may be sent through an application programming interface or by accessing the secondary system through other protocols, such as directly through an interface of the secondary system.

The processor 640 may be configured to execute computer instructions that cause the property module 610, the optimization module 620, and the recommendation module 630 to perform the functions and operations described herein. The computer instructions may be loaded into the memory 650 for execution by the processor 640 and/or data generated, received, or operated on during performance of the functions, and operations described herein may be at least temporarily stored in the memory 650.

The interface module 660 may be configured to receive data from and/or to send data to other systems, users, and/or other processes over any type of communications network. In some embodiments, the interface module 660 may be configured to receive the location data 672 and to store the location data 672 in the database 670 and/or the memory 650.

The property module 610, the optimization module 620, and the recommendation module 630 may each be implemented in any suitable manner, such as a program, software, library, application, script, function, software-as-service, analog or digital circuitry, or any combination thereof. Modifications, additions, or omissions may be made to the location data manager 600 without departing from the scope of the present disclosure. For example, the location data manager 600 may be configured to have any number of different modules.

Figure 7:
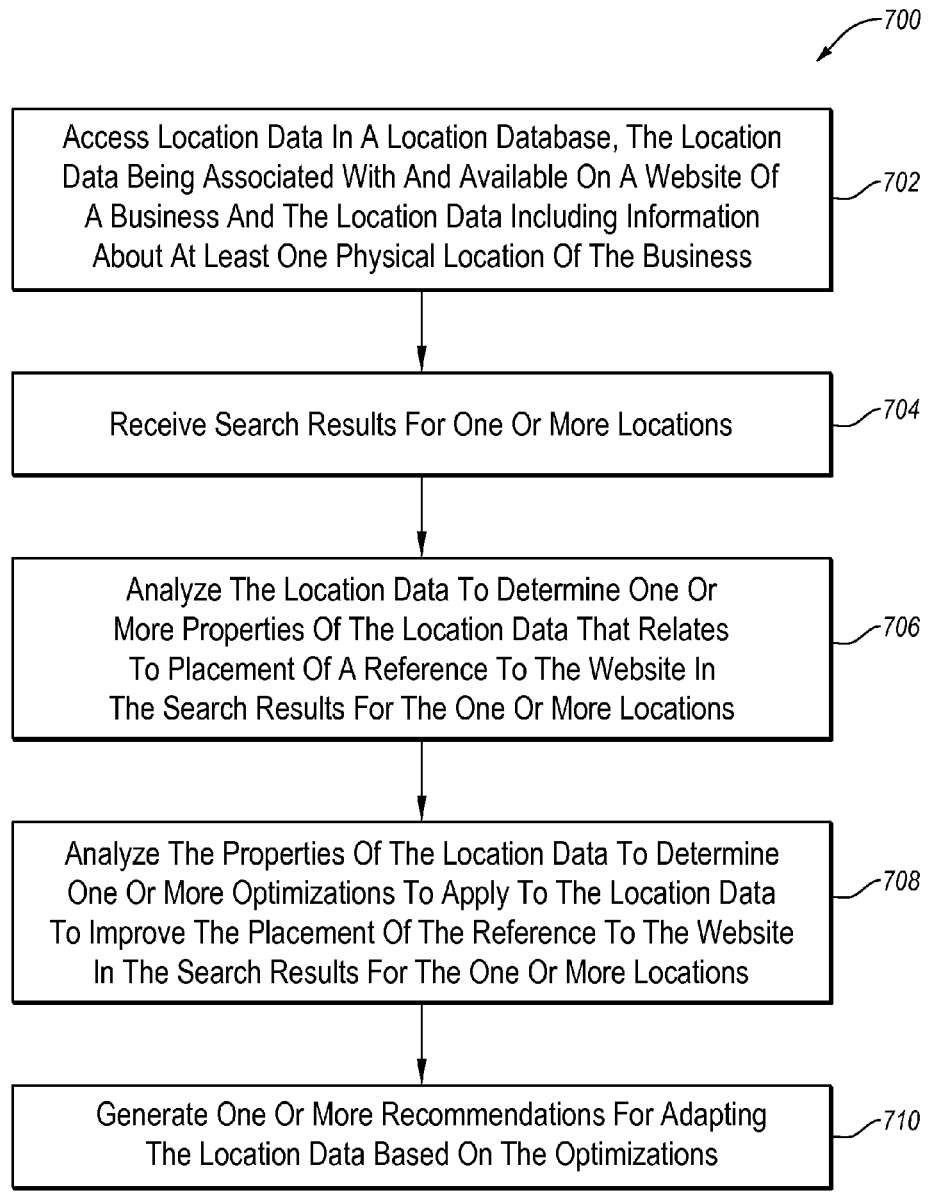
FIG. 7 is a flowchart of an example method of optimizing a website by managing location data.

FIG. 7 is a flowchart of an example method 700 of optimizing a website by managing location data, according to some embodiments described herein. The method 700 may be implemented, in some embodiments, by a location data manager, such as the location data manager 600 of FIG. 6, for instance. Although illustrated as discrete blocks, various blocks may be divided into additional blocks, combined into fewer blocks, or eliminated, depending on the desired implementation.

The method 700 may begin at block 702, where location data in a location database may be accessed. The location data may be associated with and available on a website of a business and the location data may include information about at least one physical location of the business. In some embodiments, the location database may be part of a content management system that manages the content displayed on the website. Alternately or additionally, the location database may be part of a database external to the website controlled by a third party. For example, the location database may be controlled by Yelp, Goolge+ Local, or some other digital content provider. In block 704, search results for one or more locations may be received.

In block 706, the location data may be analyzed to determine one or more properties of the location data that relates to placement of a reference to the website in the search results for the one or more locations. In some embodiments, the one or more properties of the location data may include accuracy of the location data, data field types, data field formatting, among others. In some embodiments, the data field types may include an address field, a map field, a phone number field, a business hours field, among other fields.

In block 708, the properties of the location data may be analyzed to determine one or more optimizations to apply to the location data to improve the placement of the reference to the website in the search results for the one or more locations. In block 710, one or more recommendations may be generated for adapting the location data based on the optimizations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the method 700 may be performed by a first system. In these and other embodiments, the method 700 may further include automatically and directly inputting the recommendation from within the first system into a second system through a direct interface or an application specific interface. In these and other embodiments, the second system may be a database or a content management system and the first system may be a search engine optimization platform.

Some embodiments described herein include a computer program product having computer-executable instructions for causing a computing system having the computer program product to perform a computing method of the computer-executable instructions for increasing SEO performance of digital content. The computing method may be any method described herein as performed by a computing system. The computer program product may be located on a computer memory device, which may be removable or integrated with the computing system.

Some embodiments described herein include a computing system capable of performing the methods described herein. As such, the computing system may include a memory device that has the computer-executable instructions for performing the method.

In some embodiments, a computing device, such as a computer or memory device of a computer, may include a determination module and a reporting module. The determination module and reporting module may be configured to perform any of the methods described herein. In addition, the determination module and reporting module may be combined into a single module or on a single platform. In some embodiments, a computer program product may include one or more algorithms for performing any of the methods of any of the claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein could implement the functionalities associated with the name of the module or component.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein may implement the functionalities associated with the name of the module or component.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. A method of analyzing, reporting on, and optimizing digital content for searches performed on mobile devices, the method comprising:
   obtaining identification of digital content that includes one or more pages intended for display on various classes of devices;
   receiving search results resulting from a search requested from a mobile device;
   analyzing, by a processor, the digital content to determine one or more properties of the digital content that relate to placement of a reference to the digital content in the search results for the mobile device, the one or more properties of the digital content not relating to placement of the reference to the digital content in search results resulting from a search requested from non-mobile devices and one of the one or more properties of the digital content including a keyword type property;
   analyzing the one or more properties of the digital content to determine one or more optimizations to apply to the digital content to change at least one of the one or more properties of the digital content to thereby improve the placement of the reference to the digital content in the search results for the mobile device;
   generating a keyword geographic location map that rates search performances of keywords based on actual geographic locations of the mobile device that requests the search through a search engine be performed based on keywords that results in the search results, one of the optimizations to apply to the digital content including changing the digital content to include a keyword from the keyword geographic location map; and
   generating one or more recommendations to change the digital content based on the optimizations.

2. The method of claim 1, wherein the digital content is a website and the one or more pages are webpages of the website.

3. The method of claim 1, wherein other of the one or more properties of the digital content include a size of one or more of the one or more pages, a compression ratio of one or more of the one or more pages, keywords associated with an autocomplete feature used by the mobile device, keywords associated with a geographic location identified in content of the digital content, a mobile device flag, a mobile device sub-domain, and mobile device specific content.

4. The method of claim 3, wherein the mobile device flag property includes the digital content being configured to redirect a server to one or more of the pages of the digital content configured for a device that requested the digital content.

5. The method of claim 4, wherein the device that requested the digital content is a mobile device and the one or more of the pages of the digital content configured for the mobile device includes the mobile device sub-domain and the mobile device specific content.

6. The method of claim 1, wherein the search performances of the keywords are based on search volume of the keywords.

7. The method of claim 1, wherein other of the one or more properties the property of the digital content includes geographic location information included in content of the digital content, wherein analyzing the geographic location information when the digital content includes geographic location information further includes determining when the geographic location information includes one or more of the following fields: an address field, a business hours field, a map field, a directions field, and a phone number field.

8. The method of claim 7, wherein one of the one or more optimizations to apply to the digital content includes updating geographic location information included in the digital content.

9. The method of claim 1, wherein the method is performed by a first system, the method further comprising automatically and directly inputting one or more of the one or more recommendations from within the first system into a second system through a direct interface or an application specific interface, wherein the second system is a database or a content management system and the first system is a search engine optimization platform.

10. One or more non-transitory computer-readable media configured to store instructions that when executed by one or more processing systems perform operations, the operations comprising:
   obtaining identification of digital content that includes one or more pages intended for display on various classes of devices;
   receiving search results resulting from a search requested from a mobile device;
   analyzing, by a processor, the digital content to determine one or more properties of the digital content that relate to placement of a reference to the digital content in the search results for the mobile device, the one or more properties of the digital content not relating to placement of the reference to the digital content in search results resulting from a search requested from non-mobile devices and one of the one or more properties of the digital content including a keyword type property;
   analyzing the one or more properties of the digital content to determine one or more optimizations to apply to the digital content to change at least one of the one or more properties of the digital content to thereby improve the placement of the reference to the digital content in the search results for the mobile device;
   generating a keyword geographic location map that rates search performances of keywords based on actual geographic locations of the mobile device that requests the search through a search engine be performed based on keywords that results in the search results, one of the optimizations to apply to the digital content including changing the digital content to include a keyword from the keyword geographic location map; and
   generating one or more recommendations to change the digital content based on the optimizations.

11. The one or more non-transitory computer-readable media of claim 10, wherein the digital content is a website and the one or more pages are webpages of the website.

12. The one or more non-transitory computer-readable media of claim 10, wherein other of the one or more properties of the digital content include a size of one or more of the one or more pages, a compression ratio of one or more of the one or more pages, keywords associated with an auto-complete feature used by the mobile device, a mobile device flag, a mobile device sub-domain, and mobile device specific content.

13. The one or more non-transitory computer-readable media of claim 12, wherein the mobile device flag property includes the digital content being configured to redirect a server to one or more of the pages of the digital content configured for a device that requested the digital content.

14. The one or more non-transitory computer-readable media of claim 13, wherein the one or more of the pages of the digital content configured for the mobile device includes the mobile device sub-domain and the mobile device specific content.

15. The one or more non-transitory computer-readable media of claim 10, wherein the search performances of the keywords are based on search volume of the keywords.

16. The one or more non-transitory computer-readable media of claim 10, wherein other of the one or more properties of the digital content includes geographic location information included in content of the digital content, wherein analyzing the geographic location information when the digital content includes geographic location information further includes determining when the geographic location information includes one or more of the following fields: an address field, a business hours field, a map field, a directions field, and a phone number field.

17. The one or more non-transitory computer-readable media of claim 16, wherein one of the one or more optimizations to apply to the digital content includes updating geographic location information included in the digital content.

18. The one or more non-transitory computer-readable media of claim 10, wherein the one or more processing systems are one or more first processing systems, the operations further comprising automatically and directly inputting one or more of the one or more recommendations from within the first processing systems into a second processing system through a direct interface or an application specific interface, wherein the second processing system is a database or a content management system and the first processing systems are a search engine optimization platform.

19. A system comprising:
   one or more processors;
   one or more non-transitory computer-readable media configured to store instructions that when executed by the one or more processors perform operations, the operations comprising:
   obtaining identification of digital content that includes one or more pages intended for display on various classes of devices;
   receiving search results resulting from a search requested from a mobile device;
   analyzing, by a processor, the digital content to determine one or more properties of the digital content that relate to placement of a reference to the digital content in the search results for the mobile device, the one or more properties of the digital content not relating to placement of the reference to the digital content in search results resulting from a search requested from non-mobile devices and one of the one or more properties of the digital content including a keyword type property;
   analyzing the one or more properties of the digital content to determine one or more optimizations to apply to the digital content to change at least one of the one or more properties of the digital content to thereby improve the placement of the reference to the digital content in the search results for the mobile device;
   generating a keyword geographic location map that rates search performances of keywords based on actual geographic locations of the mobile device that requests the search through a search engine be performed based on keywords that results in the search results, one of the optimizations to apply to the digital content including changing the digital content to include a keyword from the keyword geographic location map; and generating one or more recommendations to change the digital content based on the optimizations.

20. The system of claim 19, wherein the digital content is a website and the one or more pages are webpages of the website.

21. The system of claim 19, wherein other of the one or more properties of the digital content include a size of one or more of the one or more pages, a compression ratio of one or more of the one or more pages, keywords associated with an auto-complete feature used by the mobile device, a mobile device flag, a mobile device sub-domain, and mobile device specific content.

22. The system of claim 21, wherein the mobile device flag property includes the digital content being configured to redirect a server to one or more of the pages of the digital content configured for a device that requested the digital content.

23. The system of claim 22, wherein the one or more of the pages of the digital content configured for the mobile device includes the mobile device sub-domain and the mobile device specific content.

24. The system of claim 19, wherein the search performances of the keywords are based on search volume of the keywords.

25. The system of claim 19, wherein other of the one or more properties of the digital content includes geographic location information included in content of the digital content, wherein analyzing the geographic location information when the digital content includes geographic location information further includes determining when the geographic location information includes one or more of the following fields: an address field, a business hours field, a map field, a directions field, and a phone number field.

26. The system of claim 25, wherein one of the one or more optimizations to apply to the digital content includes updating geographic location information included in the digital content.

27. The system of claim 19, wherein the system is a search engine optimization platform and the operations further comprise automatically and directly inputting one or more of the one or more recommendations into a second system through a direct interface or an application specific interface, wherein the second system is a database or a content management system.

* * * * *